US007624178B2

(12) United States Patent
Tevis (10) Patent No.: US 7,624,178 B2
(45) Date of Patent: Nov. 24, 2009

(54) APPARATUS, SYSTEM, AND METHOD FOR DYNAMIC ADJUSTMENT OF PERFORMANCE MONITORING

(75) Inventor: Gregory John Tevis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 11/363,432

(22) Filed: Feb. 27, 2006

(65) Prior Publication Data

US 2007/0226631 A1 Sep. 27, 2007

(51) Int. Cl.
*G06F 15/173* (2006.01)
*G06F 19/00* (2006.01)
*G06F 15/177* (2006.01)

(52) U.S. Cl. ............... 709/224; 709/223; 709/221; 709/220; 700/108; 700/109; 715/736; 715/734

(58) Field of Classification Search ......... 709/223–224, 709/238, 220–221, 216; 370/412, 242, 485, 370/244; 700/108, 109; 715/736, 734
See application file for complete search history.

(56) References Cited

U.S. PATENT DOCUMENTS

| | | | | |
|---|---|---|---|---|
| 6,148,335 A | | 11/2000 | Haggard et al. ............. | 709/224 |
| 6,434,626 B1 * | | 8/2002 | Prakash et al. .............. | 709/238 |
| 6,792,557 B1 * | | 9/2004 | Takamoto et al. ............ | 714/7 |
| 7,194,538 B1 * | | 3/2007 | Rabe et al. .................. | 709/224 |
| 7,260,628 B2 * | | 8/2007 | Yamamoto et al. .......... | 709/224 |
| 7,275,103 B1 * | | 9/2007 | Thrasher et al. ............. | 709/224 |
| 2003/0084071 A1 | | 5/2003 | Lulo ........................... | 707/200 |
| 2003/0093709 A1 | | 5/2003 | Ogawa et al. ................ | 714/4 |
| 2003/0126282 A1 | | 7/2003 | Sarkar et al. ................ | 709/237 |
| 2004/0088400 A1 | | 5/2004 | Daggett ....................... | 709/224 |
| 2004/0122647 A1 | | 6/2004 | Monroe et al. ............... | 703/22 |
| 2004/0225662 A1 * | | 11/2004 | Nojima ........................ | 707/10 |
| 2005/0039085 A1 | | 2/2005 | Takeda et al. ................ | 714/57 |
| 2005/0050270 A1 | | 3/2005 | Horn et al. ................... | 711/114 |
| 2006/0293777 A1 * | | 12/2006 | Breitgand et al. ........... | 700/108 |

* cited by examiner

*Primary Examiner*—Quang N. Nguyen
*Assistant Examiner*—Benjamin M Thieu
(74) *Attorney, Agent, or Firm*—Kunzler & McKenzie (57) ABSTRACT

An apparatus, system, and method are disclosed for dynamically adjusting performance monitoring of storage area network ("SAN") components. An initial violation module is included to determine that a threshold violation associated with a SAN component is an initial threshold violation. A violation entry module is included to record a component violation entry in response to the initial threshold violation. An entry adjustment module is included to adjust a component violation entry associated with a SAN component in response to a threshold violation related to the SAN component. An analysis module is included to analyze the component violation entry based on analysis criteria. A suspicion adjustment module is included to adjust a suspicion variable associated with the SAN component in response to results of the analysis of the component violation entry.

35 Claims, 7 Drawing Sheets

APPARATUS, SYSTEM, AND METHOD FOR DYNAMIC ADJUSTMENT OF PERFORMANCE MONITORING

BACKGROUND OF THE INVENTION

1. Field of the Invention

This invention relates to monitoring storage area network ("SAN") components and more particularly relates to dynamically adjusting performance monitoring of SAN components.

2. Description of the Related Art

Storage performance management and analysis has led to significant improvements in computer hardware, hardware controllers, and software. Storage performance management and analysis facilitates identification of data I/O bottlenecks and points of underutilization. In particular, monitoring and analyzing hardware devices, firmware, and hardware control software has led to great technological advances. One such advance is the design, standardization, and adoption of a Storage Area Network ("SAN").

SANs are often used in large organizations such as enterprise environments having many servers and many storage devices. A SAN is an inter-networked set of hardware devices that enables storage devices such as disk drives, tape drives, optical drives and the like to exchange storage data with end-user applications and/or servers dedicated to storing and retrieving data. A typical SAN may include a complex network of Host Bus Adapters, Ports, a maze of Switches (often connected via InterSwitch Links (ISLs)), Virtualization solutions, Storage Subsystem Ports, and Storage Subsystem Volumes between the application that originates the data and the hardware storage device actually storing the data.

Storage data travels from an application on one end of the SAN to a storage device on the other end of the SAN along a data storage path. Typically, due to the complexity of the SAN, the data storage path varies with each I/O as the data is routed across the SAN. Along the data storage path a variety of SAN components and parameters can affect how efficiently and successfully the storage data travels through the SAN. Monitoring the performance of the SAN as a whole permits actions to be taken to avoid bottlenecks of storage data or underutilization of SAN components. Such monitoring can not be performed at the application level because there is no single application that controls all the entry and exit points to the SAN. Consequently, the SAN components are monitored at the firmware, communication port, and hardware device levels.

Unfortunately, monitoring SAN components at such a low level becomes difficult due to the high number of SAN components and the high volumes of storage data that is generated by these SAN components. All of the monitoring data that is collected is stored such that analysis and troubleshooting queries can be performed. Unfortunately, the vast majority of the data collected may not even be relevant to a particular bottleneck or storage management problem being researched. In addition, SAN component monitoring should be performed in a manner that creates minimal interference with storage I/O traveling through the SAN. The more SAN storage performance data collected, the higher the impact of the performance monitoring on overall SAN performance. Finally, SAN component performance monitoring typically requires monitoring for a period of days so that error conditions can be detected as problems requiring action rather than anomalies.

Even if all the monitoring data produced by monitoring all the SAN components in a typical SAN could be collected and stored, analyzing such high volumes w of data is difficult. The complexity of the SAN and its constituent components makes it difficult for analysts to determine cause and effect relationships such that action can be taken to remedy a problem. Part of the difficulty comes in distinguishing normal performance data from abnormal performance data. Often monitoring thresholds are set and crossed while the context operation indicates that the activity crossing the threshold is normal. Monitoring at such a low level often means that contextual information relating to a monitored event is lost. This further complicates the performance monitoring task on a SAN.

Therefore, operators and managers of the SAN must be selective in determining which SAN components to monitor. Consequently, the results of such manually defined SAN component monitoring are suspect because of the concern that some SAN component that played a role in the performance results were missed in the definition of the set of SAN components to be monitored.

In addition, SAN configurations are typically very dynamic. Hardware and software devices that are connected to or members of the SAN may change from day to day very rapidly. Such a dynamic environment requires that manual definition of a set of SAN components for monitoring must be constantly updated. Even storage management systems that automate detection of SAN components, suffer from the lack of an ability to adequately collect enough data, from enough SAN components, for a sufficient time period, to make analysis and problem resolution feasible.

From the foregoing discussion, it should be apparent that a need exists for an apparatus, system, and method for dynamically adjusting performance monitoring of SAN components. Beneficially, such an apparatus, system, and method would adaptively and efficiently monitor SAN components on a network level to identify communication bottlenecks and other network performance related issues.

SUMMARY OF THE INVENTION

The present invention has been developed in response to the present state of the art, and in particular, in response to the problems and needs in the art that have not yet been fully solved by currently available SAN monitoring. Accordingly, the present invention has been developed to provide an apparatus, system, and method for dynamically adjusting performance monitoring of SAN components that overcome many or all of the above-discussed shortcomings in the art.

The apparatus for dynamically adjusting performance monitoring of SAN components is provided with a plurality of modules configured to functionally execute the necessary steps of adjusting one or more suspicion variables associated with SAN component monitoring and appropriately responding to changes in the one or more suspicion variables. These modules in the described embodiments include an initial violation module that determines that a threshold violation associated with a SAN component is an initial threshold violation. A violation entry module is included to record a component violation entry in response to the initial threshold violation. An entry adjustment module is included to adjust a component violation entry associated with a SAN component in response to a threshold violation related to the SAN component. An analysis module is included to analyze the component violation entry based on analysis criteria. A suspicion adjustment module is included to adjust a suspicion variable associated with the SAN component in response to results of the analysis of the component violation entry.

The apparatus, in one embodiment, is configured to include a suspicion reduction module that decreases the suspicion variable in response to expiration of a time limit associated with the component violation entry. In another embodiment, the suspicion reduction module includes a suspicion entry removal module that removes the component violation entry in response to the suspicion variable decreasing below a monitoring threshold.

The apparatus, in one embodiment, includes a suspicion response module that responds based on the suspicion variable crossing a suspicion threshold. In one embodiment, the suspicion response module includes a related component monitoring module that monitors SAN components connected to the SAN component responsible for the threshold violation. In another embodiment, the suspicion response module includes a direct attribute adjustment module that adjusts an attribute associated with a SAN component responsible for the threshold violation. In another embodiment, the suspicion response module includes an indirect attribute adjustment module that adjusts an attribute of a SAN component connected to the SAN component responsible for the threshold violation. In yet another embodiment, the suspicion response module includes a rerouting module that reroutes SAN traffic.

A system of the present invention is also presented for dynamically adjusting performance monitoring of SAN components. The system may be embodied by a SAN with at least one data storage device, a processor communicating with the storage area network, and a memory communicating with the processor. In particular, the system, in one embodiment, includes an initial violation module that determines that a threshold violation associated with a SAN component is an initial threshold violation. The system includes a violation entry module that records a component violation entry in response to the initial threshold violation. The system includes an entry adjustment module that adjusts a component violation entry associated with a SAN component in response to a threshold violation related to the SAN component. The system includes an analysis module that analyzes the component violation entry based on analysis of the component violation entry. The system includes a suspicion adjustment module that adjusts a suspicion variable associated with the SAN component in response to results of the analysis criteria and a suspicion response module that responds based on the suspicion variable crossing a suspicion threshold.

In one embodiment the component violation entry includes a history of threshold violations. The system may further include, in another embodiment, a history reduction module that adjusts the history to decrease the number of threshold violations tracked in response to expiration of a time limit associated with the component violation entry. In another embodiment, the history reduction model includes a history entry removal module that removes a component violation entry in response to the number of threshold violations tracked crossing a minimum threshold violation limit.

A method of the present invention is also presented for dynamically adjusting performance monitoring of SAN components. The method in the disclosed embodiments substantially includes the steps necessary to carry out the functions presented above with respect to the operation of the described apparatus and system. In one embodiment, the method includes determining that a threshold violation associated with a SAN component is an initial threshold violation and recording a component violation entry in response to the initial threshold violation. The method includes adjusting a component violation entry associated with a SAN component in response to a threshold violation related to the SAN component. The method includes analyzing the component violation entry based on analysis criteria, and adjusting a suspicion variable associated with the SAN component in response to results of the analysis of the component violation entry.

In one embodiment, the method also includes decreasing the suspicion variable in response to expiration of a time limit associated with the component violation entry. The embodiment may further include removing the component violation entry in response to the suspicion variable decreasing below a monitoring threshold.

In one embodiment, the method also includes responding based on the suspicion variable crossing a suspicion threshold. The embodiment may include monitoring SAN components connected to the SAN component responsible for the threshold violation. The connection between SAN components and the SAN component responsible for the threshold violation may comprise a physical connection or a logical connection. The embodiment may also include adjusting an attribute associated with a SAN component responsible for the threshold violation. The embodiment may also include adjusting an attribute of a SAN component connected to the SAN component responsible for the threshold violation. The embodiment may also include rerouting SAN traffic or sending a notification.

In a further embodiment, the component violation entry comprises a history of threshold violations. The embodiment may include adjusting the history to decrease the number of threshold violations tracked in response to expiration of a time limit associated with the component violation entry. The embodiment may also include removing a component violation entry in response to the number of threshold violations tracked crossing a minimum threshold violation limit. Adjusting the history to decrease the number of threshold violations tracked may include decreasing a threshold violation counter. Adjusting the history to decrease the number of threshold violations tracked may be in response to receiving a threshold expiration signal from the SAN component. In one embodiment, each suspicion variable corresponds to one SAN component violation entry.

Another method of the present invention is also presented for dynamically adjusting performance monitoring of SAN components. The method includes determining that a threshold violation associated with a SAN component is an initial threshold violation and recording a component violation entry in response to the initial threshold violation. The method includes adjusting a component violation entry associated with a SAN component in response to a threshold violation related to the SAN component. The method includes adjusting a suspicion variable a large amount, where the suspicion variable adjusted a large amount is associated with the component violation entry of a SAN component directly related to the SAN component responsible for the threshold violation. In addition, the method includes adjusting a suspicion variable a small amount, where the suspicion variable adjusted a small amount is associated with the component violation entry of a SAN component indirectly related to the SAN component responsible for the threshold violation. The method includes decreasing a suspicion variable associated with a component violation entry in response to expiration of a time limit associated with the component violation entry, and removing the component violation entry with the expired time limit in response to the suspicion variable associated with the component violation entry with the expired time limit decreasing below a monitoring threshold. In one embodiment, the method includes responding based on a suspicion variable crossing a suspicion threshold.

Yet another method of the present invention is also presented for dynamically adjusting performance monitoring of SAN components. The method includes accessing a SAN and executing a monitoring software utility to monitor SAN components. The monitoring software utility determines that a threshold violation associated with a SAN component is an initial threshold violation and records a component violation entry in response to the initial threshold violation. The monitoring software utility also adjusts a component violation entry associated with a SAN component in response to a threshold violation related to the SAN component, analyzes the component violation entry based on analysis criteria, and adjusts a suspicion variable associated with the SAN component in response to results of the analysis of the component violation entry. The method also includes analyzing the suspicion variable and reporting the suspicion variable.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line hard drive, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams described herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
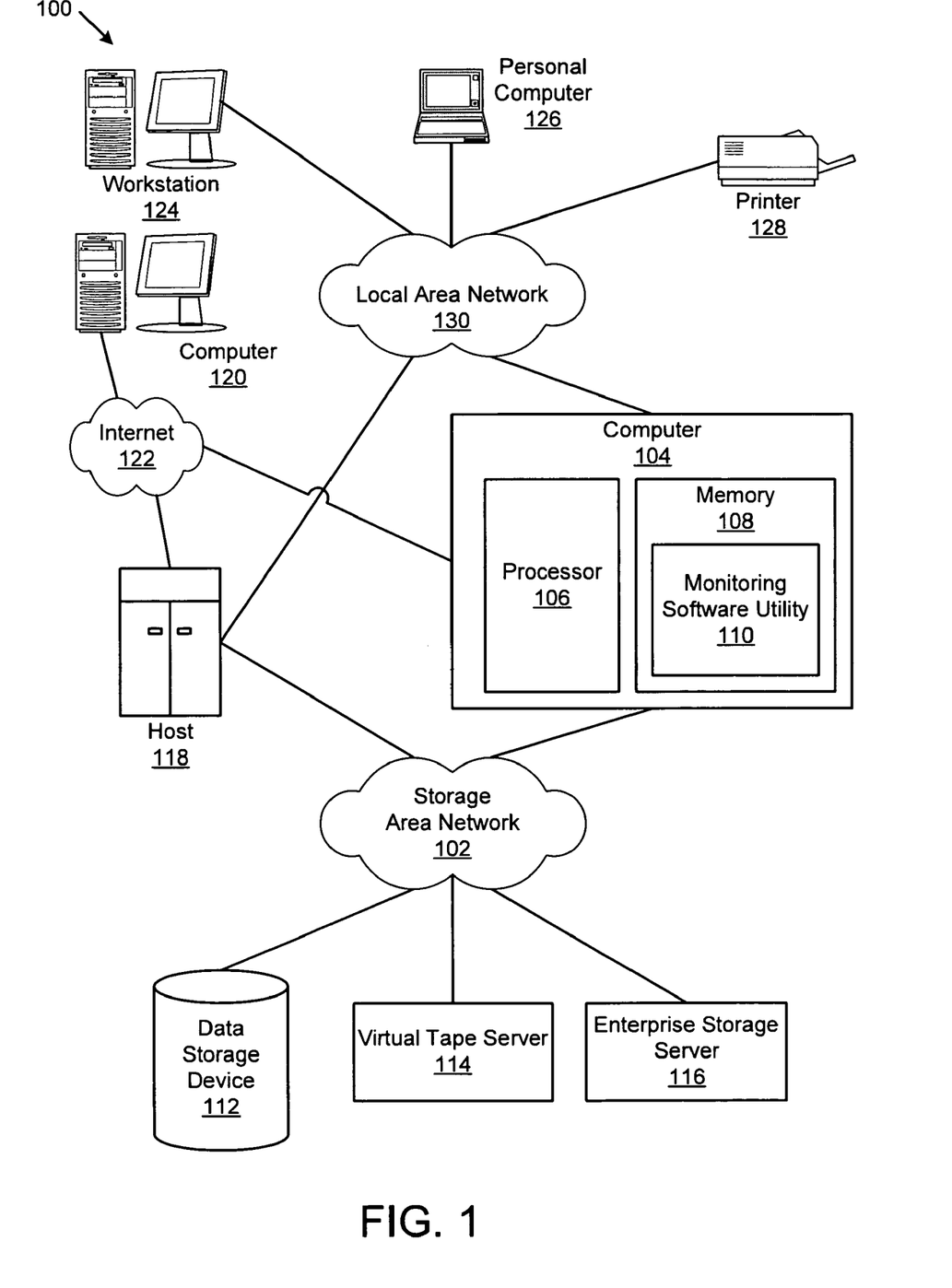
FIG. 1 is a schematic block diagram illustrating a system for dynamically adjusting performance monitoring of SAN components.

FIG. 1 is a schematic block diagram illustrating a system 100 for dynamically adjusting performance monitoring of storage area network ("SAN") components. The system 100 includes a storage area network ("SAN") 102 and a computer 104. The computer 104 includes a processor 106 and a memory 108. The memory 108 includes a monitoring software utility 110 capable of monitoring SAN components and will be described in subsequent figures. The SAN 102 is connected to at least one data storage device 112, but may also include other SAN components, storage subsystems, and systems such as a virtual tape server ("VTS") 114 or an Enterprise Storage Servers ("ESS") 116 from IBM®. The SAN 102 may also connect to a host 118 or other network capable device.

The host 118 may connect to one or more computers 120 through the Internet 122 or may connect to devices such as workstations 124, personal computers 126, printers 128, and the like through a local area network 130. The computer 104 with the monitoring software utility 110 may also connect to the local area network ("LAN") 130 and/or to the Internet 122. The monitoring software utility 110 may reside on any device or computer capable of accessing the SAN 104, wired or wireless, such as the host 118, the computer 120 with Internet 122 access, the data storage device 112, the VTS 114, the ESS 116, or other device on the local area network 130 that may access the SAN 104. The monitoring software utility 110 may execute on a single computer or device or may be distributed among a plurality of computing devices.

Figure 2:
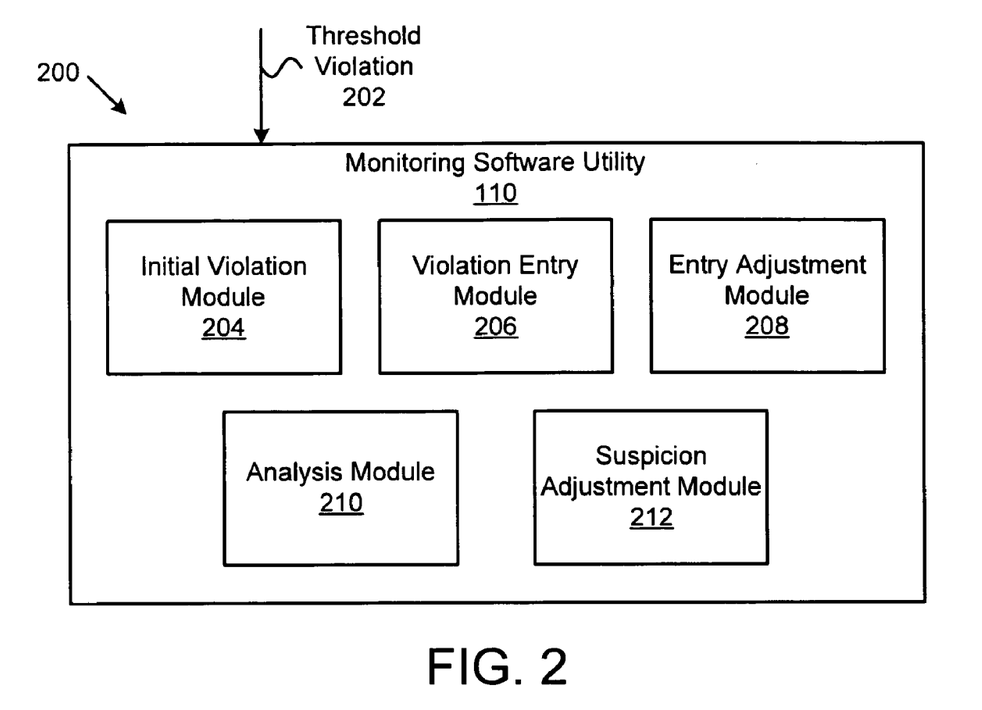
FIG. 2 is a schematic block diagram illustrating one embodiment of an apparatus for dynamically adjusting performance monitoring of SAN components.

FIG. 2 is a schematic block diagram illustrating one embodiment of an apparatus 200 for dynamically adjusting performance monitoring of SAN components. The apparatus 200 includes a monitoring software utility 110 that is substantially similar to the monitoring software utility 110 described in relation to FIG. 1. The monitoring software utility 110 receives a threshold violation 202 and includes an initial violation module 204, a violation entry module 206, an entry adjustment module 208, an analysis module 210, and a suspicion adjustment module 212, all of which are described in detail below.

The monitoring software utility 110 receives a threshold violation 202 from a SAN component. The SAN component may be a component integral to the SAN 102 such as a switch, router, hub, host bus adapter, network computer, or the like or may be a component or subsystem of the SAN such as a data storage device 112, VTS 114, or ESS 116. The SAN component may also comprise a host 118, or other devices connected to the SAN 102 via the LAN 130 or Internet 122. The SAN component may be a component, subcomponent, subsystem, or any other computer hardware or software within the SAN capable of being monitored and generating a signal, message, alarm, or the like in response to a violation of a monitoring threshold. The threshold violation 202 may be transmitted to the monitoring software utility 110 over the SAN 102, LAN 130, Internet 122, sub-network, command and control network, or any other means capable of transmitting a threshold violation 202 from a SAN component.

The monitoring software utility 110 includes an initial violation module 204 configured to determine that a threshold violation 202 associated with a SAN component is an initial threshold violation. An initial threshold violation may be characterized in one embodiment as a threshold violation 202 received by the monitoring software utility 110 for the first time. In another embodiment, an initial threshold violation is from a SAN component not currently being monitored by the monitoring software utility 110. In yet another embodiment, the initial threshold violation is a threshold violation 202 from a SAN component where all previous threshold violations 202 have expired or been removed from monitoring for a particular reason. One of skill in the art will recognize other threshold violations 202 that qualify as an initial threshold violation.

The monitoring software utility 110 includes a violation entry module 206 configured to record the initial threshold violation by way of a component violation entry. The violation entry module 206 may record a component violation entry in a table, database, file, or similar persistent or non-persistent data structure. The violation entry module 206 may record the time of the initial threshold violation, timestamp information from a threshold violation, SAN component identity, SAN subsystem and/or zone identity, SAN component performance data, SAN component attributes, and the like. The violation entry module 206 may record an initial threshold violation as one part of the component violation entry or may record selected data from the threshold violation 202 in the component violation entry. One of skill in the art will recognize other data structures suitable for recording an initial threshold violation and data to be stored as part of the component violation entry.

The monitoring software utility 110 includes an entry adjustment module 208 configured to adjust a component violation entry associated with a SAN component in response to a threshold violation 202 related to the SAN component. In one embodiment, the entry adjustment module 208 records the threshold violation 202 in the component violation entry. Recording the threshold violation 202 may include a time stamp, performance information, SAN component attributes or the like. Adjusting the component violation entry may comprise adjusting a counter, updating timestamp information, adjusting parameters, or the like. Tracking SAN component threshold violations 202 by adjusting a component violation entry is advantageous because it provides a history of threshold violations 202 for a SAN component in a useful format. This history can be used to detect repeated violations, detect patterns, identify cause and effect relationships, and the like. Adjusting a component violation entry allows consolidation of threshold violation 202 information of a SAN component in a convenient location rather than being spread out in a file containing logged entries or being lost once a threshold violation 202 is acknowledged.

Typically, adjusting the component violation entry is in response to a threshold violation 202 directly related to a SAN component associated with the component violation entry. In an alternate embodiment, the entry adjustment module 208 adjusts a component violation entry based on a threshold violation 202 associated with a SAN component other than the SAN component responsible for the component violation entry. In one embodiment, the entry adjustment module 208 adjusts the component violation entry in response to a threshold violation 202 associated with a SAN component that is indirectly related to the SAN component associated with the component violation entry. One of skill in the art will recognize other appropriate adjustments to a component entry violation in response to a threshold violation 202.

The monitoring software utility 110 includes an analysis module 210 configured to analyze the component violation entry based on analysis criteria. The analysis module 210, in one embodiment, analyzes the number of threshold violations 202 recorded in a component violation entry. In another embodiment, the analysis module 210 analyzes threshold violations 202 of component violation entries of related SAN components. Analysis criteria may include the criticality and/or nature of threshold violations 202, the structure and nature of the SAN component directly related to the component violation entry as well as SAN components indirectly related, performance data associated with threshold violations 202, frequency of threshold violations 202, attributes and threshold settings of SAN components, or other relevant metrics associated with the component violation entry and related or connected SAN components or related component violation entries.

Discussion of related or connected SAN components includes any SAN component that is logically or physically connected to the SAN component responsible for a threshold violation 202 either directly or through intermediate SAN components. Related or connected SAN components may also include SAN components in physical proximity to the SAN component responsible for a threshold violation 202 without an interconnecting data path or may be associated in some other way deemed important to a SAN network administrator. Use of "related to" and "connected to" are interchangeable in this context and reference any association between a SAN component and another SAN component responsible for a threshold violation 202. One of skill in the art will recognize relevant parameters to form analysis criteria and will recognize information related to component violation entries to analyze based on the analysis criteria.

The monitoring software utility 110 includes a suspicion adjustment module 212 configured to adjust a suspicion variable associated with the SAN component in response to results of the analysis of the component violation entry. In one embodiment, a single suspicion variable may be related to each component violation entry. A suspicion variable is an indicator calculated from analysis of one or more component violation entries that provides visibility of increased traffic, overloading, component failure, or other relevant metric of a SAN component. A suspicion variable is intended to provide a mechanism to trigger some action within the network such as notifying a network administer of a problem condition, rerouting network traffic, halting data flow to a SAN component, increasing monitoring activity, and the like.

In another embodiment, a suspicion variable may be related to a group of component violation entries. The suspicion adjustment module 212, in one embodiment, may adjust the suspicion variable associated with a SAN component directly related to the component violation entry analyzed by the analysis module 210. The suspicion adjustment module 212, in another embodiment, may adjust a suspicion variable associated with one or more SAN components indirectly related to the component violation entry analyzed by the analysis module 210.

In one embodiment, a suspicion variable comprises discrete steps. For example, a suspicion variable may comprise a low, medium, or high value, or may be an integer between 1 and 10, or may be binary number, or may simply be a flag with two discrete values. In another embodiment, a suspicion variable comprises a continuous spectrum. For example, a suspicion variable may be a real number between a lower limit and an upper limit. A suspicion variable may also comprise a data structure such as a matrix including relevant suspicion information. One of skill in the art will recognize other suitable embodiments of a suspicion variable capable of being adjusted based on analysis criteria.

In one embodiment, the suspicion adjustment module 212 identifies a communication bottleneck in response to analysis results from the analysis module 210 of one or more component violation entries and adjusts an appropriate suspicion variable. In the embodiment, analysis criteria are selected to recognize one or more threshold violations 202 indicating the existence of a communication bottleneck. For example, a threshold violation 202 may indicate a high data flow rate in a SAN component, and repeated threshold violations 202 collected in a component violation entry by the entry adjustment module 208 may be analyzed by the analysis module 210 and then used by the suspicion adjustment module 212 to raise the appropriate suspicion variable to a level indicating a communication bottleneck. The suspicion adjustment module 212 may identify a potential communication bottleneck by monitoring several SAN components in a critical data path or related SAN components in an array of hubs or switches.

In another embodiment, the suspicion variable module 212 adjusts a suspicion variable to indicate a component failure. In yet another embodiment, the suspicion variable module 212 adjusts a suspicion variable to indicate a communication failure. The suspicion variable module 212 may also adjust a plurality of suspicion variables. One of skill in the art will recognize other embodiments of a suspicion variable and corresponding suspicion variable values to indicate various relevant SAN performance issues.

Figure 3:
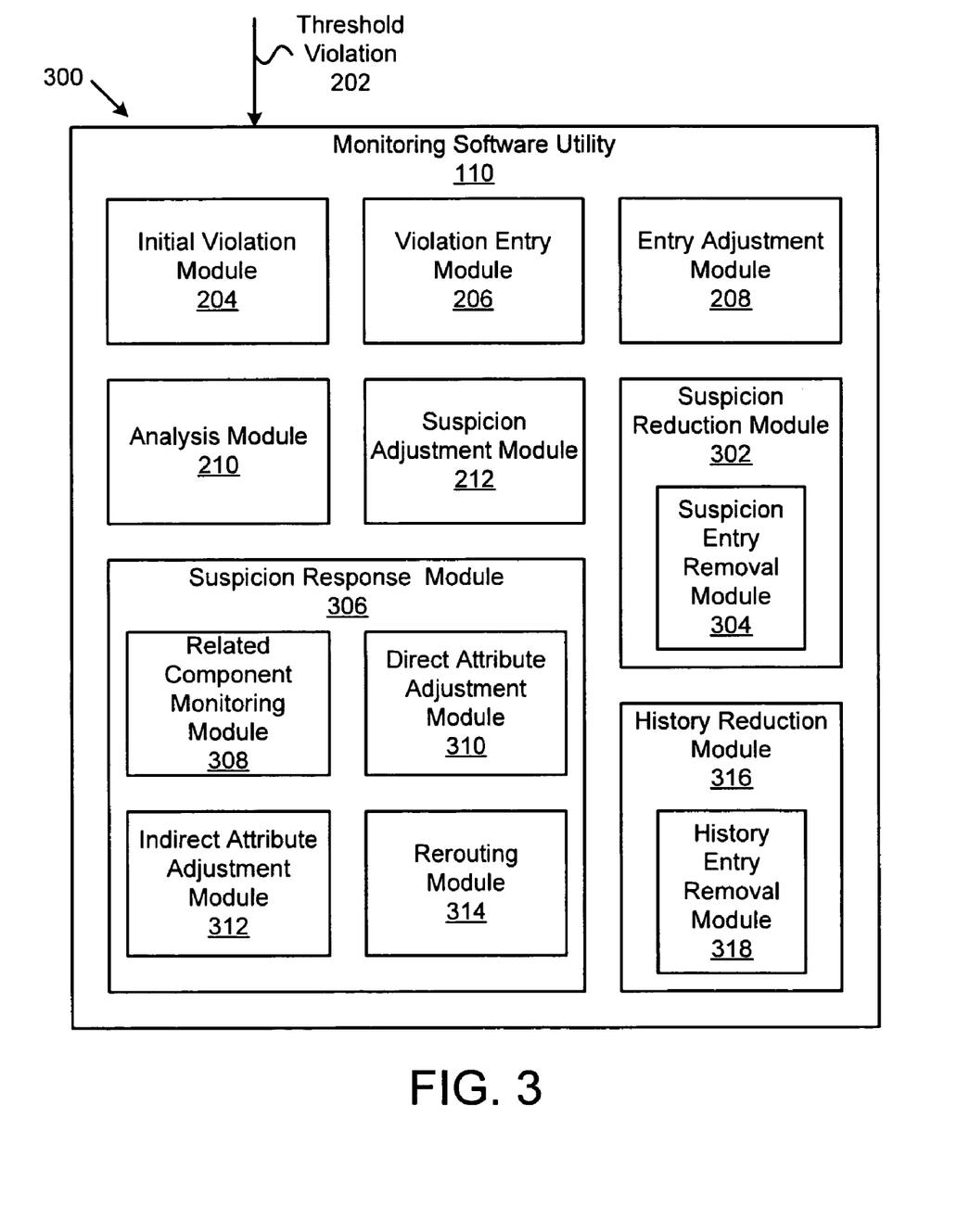
FIG. 3 is a schematic block diagram illustrating another embodiment of an apparatus for dynamically adjusting performance monitoring of SAN components.

FIG. 3 is a schematic block diagram illustrating another embodiment of an apparatus 300 for dynamically adjusting performance monitoring of SAN components. The apparatus 300 includes a monitoring software utility 110 that receives a threshold violation 202 and includes an initial violation module 204, a violation entry module 206, an entry adjustment module 208, an analysis module 210, and a suspicion adjustment module 212 substantially the same as described in relation to FIG. 2.

The monitoring software utility 110 also includes a suspicion reduction module 302, a suspicion response module 306, and a history reduction module 316. The suspicion reduction module 302 includes a suspicion entry removal module 304. The suspicion response module 306 includes a related component monitoring module 308, a direct attribute adjustment module 310, an indirect attribute adjustment module 312, and a rerouting module 314. The history reduction module 316 includes a history entry removal module 318. The modules of the apparatus 300 are described in detail below.

The monitoring software utility 110 includes a suspicion reduction module 302 configured to decrease a suspicion variable in response to expiration of a time limit associated with the component violation entry. In one embodiment, a suspicion variable level may be proportionate to the number of tracked threshold violations 202 where threshold violations 202 are each a separate entry in the component violation entry. The suspicion variable may decrease by a proportionate amount in relation to a decease in the number of tracked threshold violations 202. The number of tracked threshold violations 202 may decrease when a time limit of a threshold violation 202 expires and the threshold violation 202 is no longer tracked.

In another embodiment, a time limit for each threshold violation 202 is recorded in the component violation entry. The component violation entry may contain a separate field for the time limit and a timestamp for each threshold violation 202. The suspicion reduction module 302 reduces the suspicion variable associated with the component violation entry in response to the expiration of a time limit associated with a threshold violation 202.

In another embodiment, the component violation entry contains a timer or similar mechanism that expires at a predetermined time for each threshold violation 202. The suspicion reduction module 302 reduces an associated suspicion variable in response to expiration of the timer. In another embodiment, the threshold violation 202 includes an expiration variable or other flag. In this embodiment, the suspicion reduction module 302 reduces the suspicion variable directly upon the monitoring software utility 110 receiving a threshold violation 202 with a flag indicating that the threshold violation 202 is expired.

In another embodiment, a component violation entry includes a threshold violation counter and the entry adjustment module 208 increases the threshold violation counter when a threshold violation flag of a received threshold violation 202 indicates the violation is a new violation. The entry adjustment module 208 decreases the threshold violation counter when the threshold violation flag of a received threshold violation 202 indicates that the threshold violation 202 is expired. The suspicion reduction module 302 then reduces the suspicion variable in response to a decrease in the threshold violation counter. This embodiment is advantageous because monitoring of threshold violation time limits is accomplished at the SAN component level instead of in a monitoring software utility 110, thus decreasing the amount of data tracked in the monitoring software utility 110. Each SAN component may include a different time limit or different criteria for expiration of a threshold violation customized for that SAN component. Certain SAN components may be better able to monitor information related to a threshold violation 202 than the monitoring software utility 110.

In one embodiment, the monitoring software utility 110 includes a mixture of component violation entries. Some component violation entries may be updated via a threshold violation 202 with a new/expired flag. Other component violation entries may include threshold violation timestamp and time limit fields. Other component violation entries may include tracked threshold violations 202. One of skill in the art will recognize other combinations of threshold violation entries 202 to create an effective monitoring software utility 110.

In one embodiment, the component violation entry includes a counter with an associated timer and the suspicion reduction module 302 reduces the counter in response to not receiving a threshold violation 202 within a predetermined time period. The suspicion reduction module 302 then reduces the suspicion variable in response to reduction of the counter. In a different embodiment, the suspicion reduction module 302 reduces the suspicion variable directly in response to the software monitoring utility 110 not receiving a threshold violation 202 associated with the component violation entry in a predetermined time period. One of skill in the art will recognize other ways to decrease a suspicion variable in response to an expiration of a time limit associated with the component violation entry or directly from a threshold violation 202.

The suspicion reduction module 302 includes a suspicion entry removal module 304 configured to remove the component violation entry in response to the suspicion variable decreasing below a monitoring threshold. In one embodiment the monitoring threshold comprises a threshold of a counter in a component violation entry associated with a number of threshold violations 202. In another embodiment, the monitoring threshold is a minimum number of threshold violations 202 in a component violation entry. In yet another embodiment, the monitoring threshold is a threshold of a counter that decreases upon expiration of a time limit or upon expiration after having not received a threshold violation 202 during a prescribed time. One of skill in the art will recognize other monitoring thresholds configured as a threshold associated with a component violation entry, age of threshold violations 202, a minimum quantity of threshold violations 202, as a minimum counter limit, or the like.

The suspicion entry removal module 304 is configured to remove a component violation entry in response to the suspicion variable decreasing below the described monitoring threshold. The suspicion entry removal module 304 may remove the component violation entry by removing a table entry, removing a database entry, removing a data structure, or the like. The suspicion entry removal module 304 may also remove the component violation entry by inactivating the component violation entry, inactivating monitoring of a SAN component, monitoring a SAN component less frequently, or the like.

Beneficially, removing or deactivating a component violation entry decreases the amount of data collected and tracked by the software monitoring utility 110 to allow expanded monitoring of SAN components that may be a communication bottleneck or may be having problems. This adaptive aspect of the software monitoring utility 110 allows efficient monitoring and overcomes problems associated with current monitoring techniques.

The software monitoring utility 110 includes a suspicion response module 306 configured to respond based on the suspicion variable crossing a suspicion threshold. A suspicion threshold may be a number, a flag, a binary value, or any other representation of a level of suspicion associated with a suspicion variable. A suspicion variable may have one or more suspicion thresholds triggering different actions. A suspicion threshold may be a set of values creating a hysteresis where the threshold is triggered at one value when the suspicion variable is increasing and at a lower value when the suspicion variable is decreasing. In one embodiment, the suspicion response module 306 sends a notification in response to the suspicion variable crossing a suspicion threshold. In another embodiment, the suspicion response module 306 halts an operation in response to the suspicion variable crossing a suspicion threshold.

The suspicion response module 306 includes a related component monitoring module 308 configured to monitor SAN components connected to the SAN component responsible for the threshold violation 202. In one embodiment, the component monitoring module 308 establishes attributes and thresholds necessary to monitor SAN components connected to the SAN component responsible for the threshold violation 202. In another embodiment, the component monitoring module 308 configures the monitoring software utility 110 to start accepting threshold violations 202 from SAN components connected to the SAN component responsible for the threshold violation 202 which triggered the response based on the suspicion variable. In yet another embodiment, the related component monitoring module 308 creates component violation entries for the SAN components connected to the SAN component responsible for the threshold violation 202. In one embodiment, the connection between the SAN component responsible for the threshold violation 202 and the related SAN components comprises a direct physical connection. In another embodiment, the connection is a logical connection. The related SAN components may be directly connected to the SAN component responsible for the threshold violation 202 or may be connected through one or more intermediate SAN components.

The SAN 102 may be physically or logically divided into zones (not shown). SAN components within a SAN zone may not be directly involved a particular data storage path, but could be involved in a subsequent data storage path from the same source application or device. These SAN components are referred to herein as being "logically connected."

Beneficially, by monitoring SAN components connected to the SAN component responsible for the threshold violation 202, the software monitoring utility 110 can increase visibility of SAN components surrounding a SAN component responsible for a threshold violation 202. Such visibility is beneficial in analyzing network traffic to determine if a bottleneck exists, if a SAN component is overloaded or damaged, or if thresholds associated with a SAN component need to be readjusted. Automatically increasing which SAN components are monitored through the related component monitoring module 308 alleviates the work load of a system administrator since the system administrator does not have to manually vary monitoring to isolate problems.

The suspicion response module 306 includes a direct attribute adjustment module 310 configured to adjust an attribute associated with a SAN component responsible for the threshold violation 202. The direct attribute adjustment module 310 may adjust an attribute such as a threshold, a sampling frequency, a monitoring parameter, or other attribute of the SAN component. The suspicion response module 306 also includes an indirect attribute adjustment module 312 configured to adjust an attribute of a SAN component connected to the SAN component responsible for the threshold violation 202. The indirect attribute adjustment module 312 may adjust a threshold, a sampling frequency, a monitoring parameter, or other attribute of SAN components connected or related to the SAN component responsible for the threshold violation 202.

One of skill in the art will recognize other attributes of a SAN component to adjust or establish based on a suspicion variable of a SAN component connected directly or indirectly to the SAN component responsible for the threshold violation 202. Beneficially, the direct attribute adjustment module 310 and indirect attribute adjustment module 312 permit automatic adjustment of SAN component attributes based on a level of suspicion established through analysis of threshold violations 202 and other relevant factors.

The suspicion response module 306 includes a rerouting module 314 configured to reroute SAN traffic. The rerouting module 314, may reroute traffic in response to one or more suspicion variables indicating a traffic bottleneck, an overloaded SAN component, a malfunctioning SAN component, or the like. The rerouting module 312 may signal a SAN management module (not shown) or the SAN component directly to reroute SAN I/O traffic. One of skill in the art will recognize other ways to reroute SAN network traffic in response to one or more suspicion variables.

In one embodiment, a component violation entry of the software monitoring utility 110 includes a history of threshold violations. The software monitoring utility 110 includes a history reduction module 316 configured to adjust the history to decrease the number of threshold violations tracked in response to expiration of a time limit associated with the component violation entry. The history may comprise a table, database, list, array, or other data structure containing information from a history of threshold violations 202.

In one embodiment, the history includes a timestamp for when each threshold violation 202 occurred. In another embodiment, the history includes a time limit associated with each suspicion variable. Each time limit may be tailored to be appropriate for the SAN component responsible for the threshold violation 202. In another embodiment, the history is a threshold violation counter that increases for each threshold violation 202 from a particular SAN component. The threshold violation counter may decrease based on expiration of a time limit.

In one embodiment, the time limit is associated with a particular threshold violation 202 and may expire after a prescribed time after the threshold violation 202 occurred. In another embodiment, a SAN component stores a timer and when a time limit expires the SAN component sends a threshold violation 202 with information capable of triggering the threshold violation counter decrease. In yet another embodiment, the time limit is related to sensing incoming threshold violations 202 from a SAN component and expires when no threshold violation occurs within a prescribed time limit. One of skill in the art will recognize a suitable history in a component violation entry and a time limit expiration to decrease the history.

The history reduction module 316 includes a history entry removal module 318 configured to remove a component violation entry in response to the number of threshold violations tracked crossing a minimum threshold violation limit. In one embodiment, the minimum threshold violation limit comprises a limit of a threshold violation counter in a component violation entry where the threshold violation counter is associated with a number of threshold violations 202.

In another embodiment, the minimum threshold violation limit is a minimum number of tracked threshold violations 202 in a component violation entry table, database, or similar data structure. In yet another embodiment, the minimum threshold violation limit is a flag that is set by a threshold violation 202 from a SAN component that includes information sufficient to trigger removal of the associated component violation entry. One of skill in the art will recognize other minimum threshold violation limits configured as a threshold associated with a component violation entry, an age of a threshold violation 202, a minimum quantity of threshold violations 202, a minimum counter limit, or the like.

The history entry removal module 318 is configured to remove a component violation entry in response the number of threshold violations tracked decreasing below the described minimum threshold violation limit. The history entry removal module 318 may remove the component violation entry by removing a table entry, removing a database entry, removing a data structure, or the like. The history entry removal module 318 may also remove the component violation entry by inactivating the component violation entry, inactivating monitoring of a SAN component, monitoring a SAN component infrequently, or the like.

Beneficially, the modules of the monitoring software utility 110 combine to provide an adaptive monitoring apparatus for SAN components on a network level. The monitoring software utility 110 overcomes many of the problems of conventional SAN monitoring such as the enormous amount of performance data available regarding the SAN network. The monitoring software utility 110 provides an apparatus to focus data collection on parts of the network experiencing problems such as a communication bottleneck. The monitoring software utility 110 provides a convenient mechanism to increase monitoring on, and around, a SAN component sending one or more threshold violations 202 and to decrease monitoring for areas of the network not generating threshold violations 202. The monitoring software utility 110 allows threshold violations to be established on a device level, component level, subsystem level, or any other appropriate level for efficient monitoring of the network without generating too much data for the monitoring software utility 110 to handle. The monitoring software utility 110 also allows automatic adaptation to monitor trouble spots without requiring user intervention. The monitoring software utility 110 provides an efficient SAN monitoring tool that overcomes limitations of conventional monitoring tools.

Figure 4:
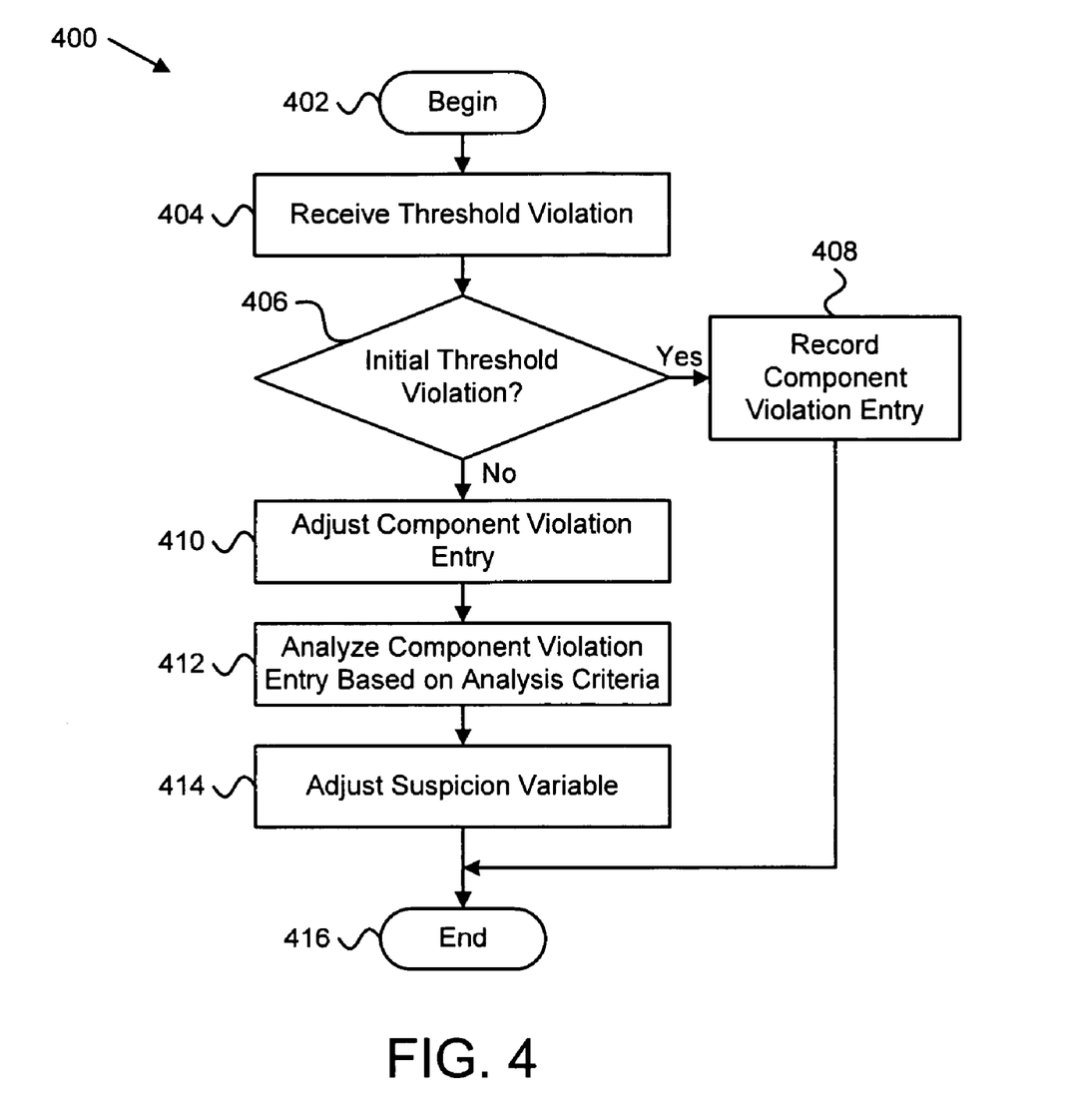
FIG. 4 is a schematic flow chart diagram illustrating one embodiment of a method for dynamically adjusting performance monitoring of SAN components.

FIG. 4 is a schematic flow chart diagram illustrating one embodiment of a method 400 for dynamically adjusting performance monitoring of SAN components. The method 400 begins 402 and the monitoring software utility 110 receives 404 a threshold violation 202. The initial violation module 204 determines 406 if the threshold violation 202 is an initial threshold violation. If the initial violation module 204 determines 406 that the threshold violation 202 is an initial threshold violation, the violation entry module 206 records 408 a component violation entry in a table, database, or other data structure and the method 400 ends 416. The component violation entry typically is related to the SAN component responsible for the threshold violation 202.

If the initial violation module 204 determines 406 that the threshold violation 202 is not an initial threshold violation, the entry adjustment module 208 adjusts 410 a component violation entry associated with a SAN component. In one embodiment, the adjusted component violation entry is directly related to the SAN component responsible for the threshold violation 202. In another embodiment, the adjusted component violation entry is indirectly related to the SAN component responsible for the threshold violation 202. Adjusting a component violation entry may comprise increasing a threshold violation counter, adding information from a threshold violation 202 to a table, database, or other data structure, updating threshold violation information in the entry, or similar adjustment.

The analysis module 210 then analyzes 412 the component violation entry based on an analysis criteria. The suspicion adjustment module 212 then adjusts 414 the suspicion variable based on the results of the component violation entry analysis and the method 400 ends 416. Based on certain results, no adjustment may be made to the suspicion variable. Instead, on the component violation entry may be adjusted. In an alternate embodiment, once the violation entry module 206 records 408 a component violation entry, the entry adjustment module 208 then adjusts 410 the component violation entry.

Figure 5:
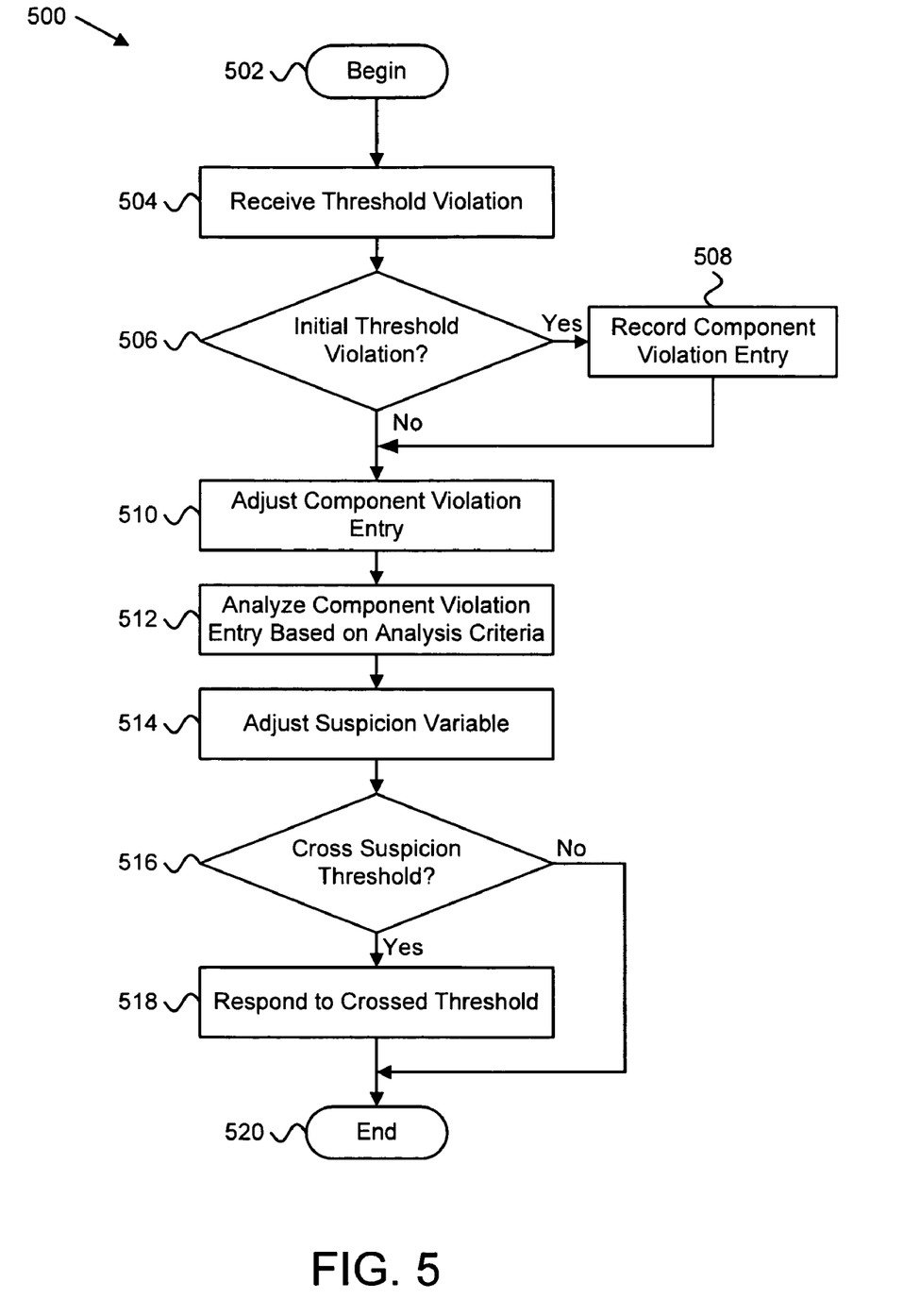
FIG. 5 is a schematic flow chart diagram illustrating another embodiment of a method for dynamically adjusting performance monitoring of SAN components.

FIG. 5 is a schematic flow chart diagram illustrating another embodiment of a method 500 for dynamically adjusting performance monitoring of SAN components. The method 500 begins 502 and the monitoring software utility 110 receives 504 a threshold violation 202. The initial violation module 204 determines 506 if the threshold violation 202 is an initial threshold violation. If the initial violation module 204 determines 506 that the threshold violation 202 is an initial threshold violation, the violation entry module 206 records 508 a component violation entry in a table, database, or other data structure. The entry adjustment module 208 then adjusts 510 a component violation entry associated with a SAN component.

If the initial violation module 204 determines 506 that the threshold violation 202 is not an initial threshold violation, the entry adjustment module 208 adjusts 510 a component violation entry associated with a SAN component. The analysis module 210 then analyzes 512 the component violation entry based on analysis criteria. The suspicion adjustment module 212 then adjusts 514 the suspicion variable based on the results of the component violation entry analysis.

The suspicion response module 306 then determines 516 if the suspicion variable crosses a suspicion threshold. If the suspicion response module 306 determines 516 that the suspicion variable crossed a suspicion threshold, the suspicion response module 306 responds 518 based on the particular suspicion threshold that is crossed and the method 500 ends 520. If the suspicion response module 306 determines 516 that the suspicion variable did not cross a suspicion threshold, the method 500 ends 520.

In one embodiment, the suspicion reduction module 302 decreases the suspicion variable and the suspicion entry removal module 304 determines 516 if the suspicion variable decreases below a monitoring threshold. If the suspicion entry removal module 304 determines 516 the suspicion variable has decreased below a monitoring threshold, the suspicion entry removal module 304 may respond 518 removing the component violation entry and the method 500 ends 520.

In another embodiment, the suspicion response module 306 responds 518 such that the related component monitoring module 308 monitors SAN components connected to the SAN component responsible for the threshold violation 202. In another embodiment, the suspicion response module 306 responds 518 such that the direct attribute adjustment module 310 adjusts an attribute associated with a SAN component responsible for with the threshold violation 202. In yet another embodiment, the suspicion response module 306 responds 518 such that the indirect attribute adjustment module 312 adjusts an attribute of a SAN component connected to the SAN component responsible for the threshold violation 202. In another embodiment, the suspicion response module 306 responds 518 such that the rerouting module 314 reroutes SAN traffic.

Figure 6:
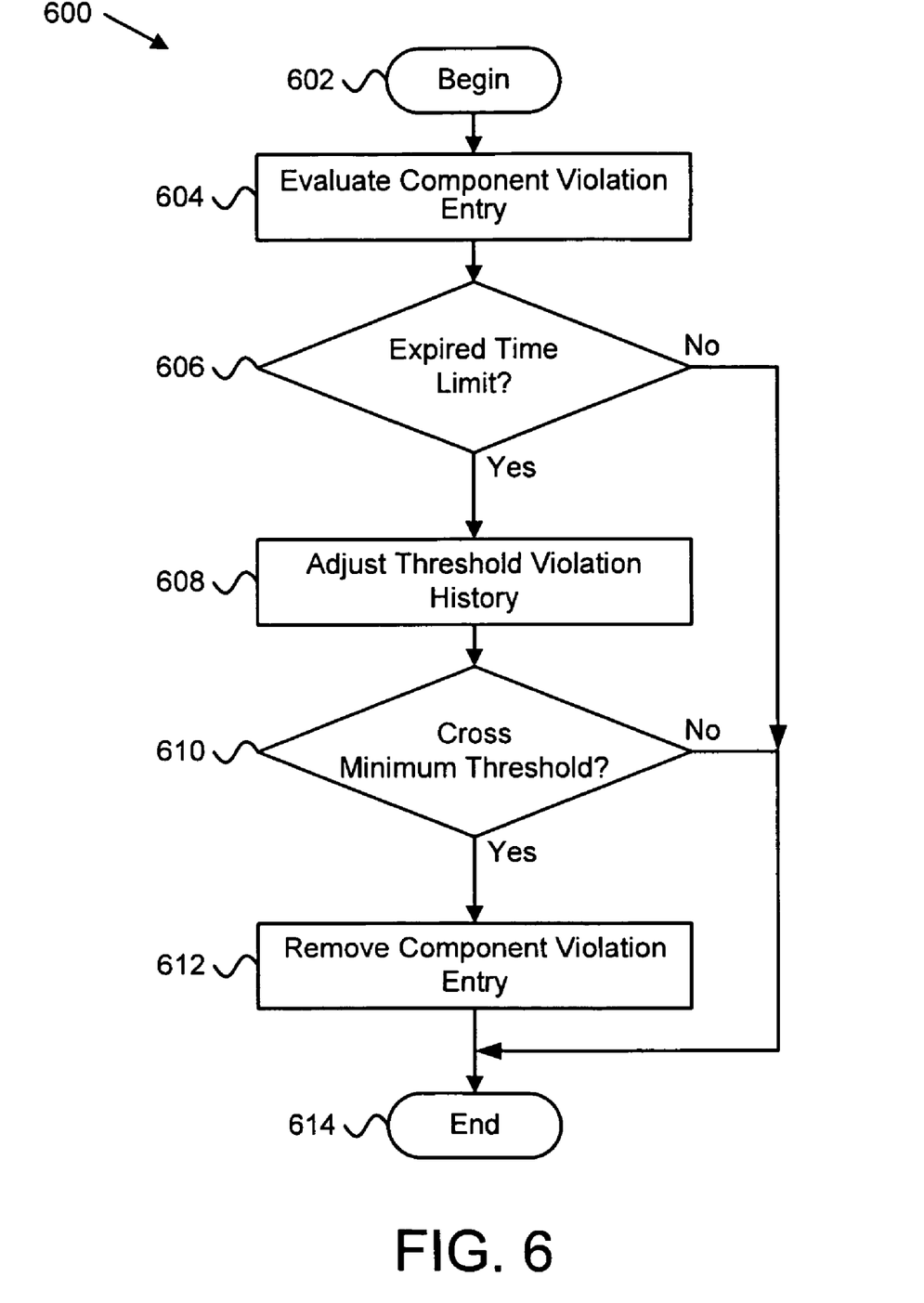
FIG. 6 is a schematic flow chart diagram illustrating a portion of an embodiment of a method for dynamically adjusting performance monitoring of SAN components.

FIG. 6 is a schematic flow chart diagram illustrating a portion of an embodiment of a method 600 for dynamically adjusting performance monitoring of SAN components. The method 600 demonstrates a particular way to determine when to remove a component violation entry. The method 600 begins 602 and the entry adjustment module 208 evaluates 604 a component violation entry associated with a SAN component. The history reduction module 316 determines 606 if there is an expired time limit associated with a threshold violation 202 tracked as part of a component violation entry. In one embodiment, the history reduction module 316 examines one or more component violation entries to determine 606 if there is an expired time limit by scanning a data structure storing component violation entries. In another embodiment, the history reduction module 316 determines 606 if there is an expired time limit associated with a threshold violation 202 by responding to a flag, interrupt, or similar mechanism associated with a time limit of a tracked threshold violation 202.

If the history reduction module 316 determines 606 there is an expired time limit, the history reduction module 316 adjusts 608 a threshold violation history to decrease the number of threshold violations tracked in the particular component violation entry with the expired time limit. The history entry removal module 318 then determines 610 if the number of tracked threshold violations 202 of the component violation entry crosses a minimum threshold violation limit. If the history entry removal module 318 determines 610 that the minimum threshold violation limit has been crossed, the history entry removal module 318 removes 612 the component violation entry with the expired time limit and the method 600 ends 614. If the history reduction module 316 determines 606 there is not an expired time limit the method 600 ends 614. If the history entry removal module 318 determines 610 that the minimum threshold violation limit has not been crossed, the method 600 ends 614.

Figure 7:
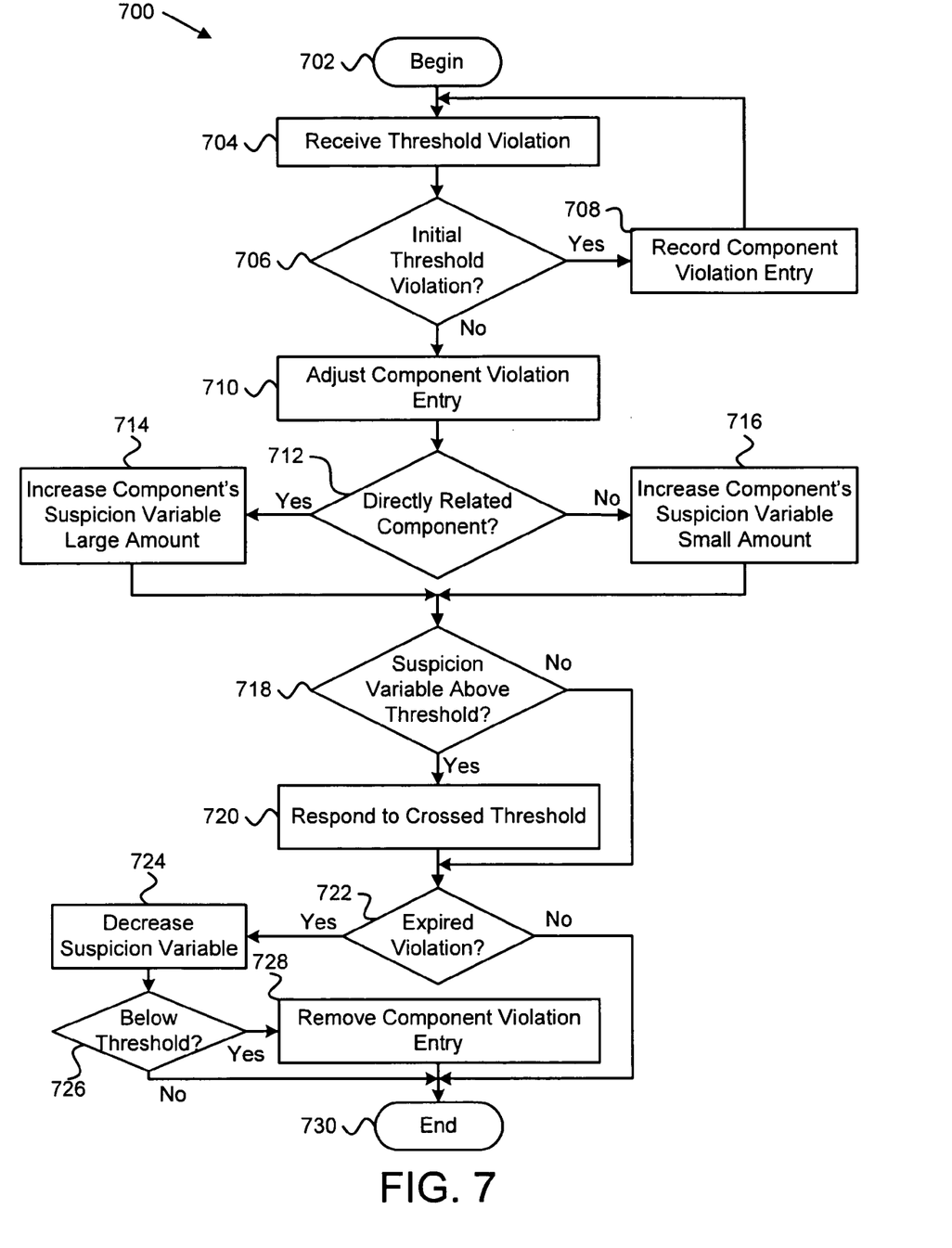
FIG. 7 is a schematic flow chart diagram illustrating one particular embodiment of a method for dynamically adjusting performance monitoring of SAN components.

FIG. 7 is a schematic flow chart diagram illustrating one particular embodiment of a method 700 for dynamically adjusting performance monitoring of SAN components. The method 700 begins 702 and the monitoring software utility 110 receives 704 a threshold violation 202. The initial violation module 204 determines 706 if the threshold violation 202 is an initial threshold violation. If the initial violation module 204 determines 706 that the threshold violation 202 is an initial threshold violation, the violation entry module 206 records 708 a component violation entry in a table, database, or other data structure and returns to receive 704 another threshold violation 202. If the initial violation module 204 determines 706 that the threshold violation 202 is not an initial threshold violation, the entry adjustment module 208 adjusts 710 a component violation entry associated with a SAN component. The entry adjustment module 208 may adjust component violation entries that are directly and indirectly related to the SAN component responsible for the threshold violation 202.

The analysis module 210 determines 712 if a component violation entry is directly related to the SAN component responsible for the threshold violation 202. If the analysis module 210 determines 712 that the component violation entry is directly related to the SAN component, the suspicion adjustment module 212 increases 714 the suspicion variable associated with the component violation entry by a relatively large amount, for example by two units or steps. If the analysis module 210 determines 712 that the component violation entry is indirectly related to the SAN component, the suspicion adjustment module 212 increases 716 the suspicion variable associated with the component violation entry by a relatively small amount, for example by one unit or step. The analysis module 210 may adjust suspicion variables different amounts based on how closely related the suspicion variables are to the SAN component responsible for the threshold violation 202. For example, the analysis module 210 may adjust a suspicion variable of a SAN component near the SAN component responsible for the threshold violation 202 a relatively large amount and adjust a suspicion variable of a SAN component farther away from the SAN component responsible for the threshold violation 202 a relatively small amount. In other words, the adjustment may be weighted depending on a SAN component's proximity to the SAN component responsible for the threshold violation.

The suspicion response module 306 determines 718 if the adjusted suspicion variable exceeds a suspicion threshold. If the suspicion response module 306 determines 718 the adjusted suspicion variable exceeds a suspicion threshold, the suspicion response module 306 responds 720 to the limit violation. Responding 720 to the threshold violation may comprise any action described above in relation to the suspicion response module 306 or any response deemed appropriate by one skilled in the art. If the suspicion response module 306 determines 718 the adjusted suspicion variable does not exceed a suspicion threshold, the suspicion response module 306 takes no action.

The suspicion reduction module 302 determines 722 if there is an expired time limit of the component violation entry associated with the suspicion variable. If the suspicion reduction module 302 determines 722 there is an expired time limit, the suspicion reduction module 302 decreases 724 the suspicion variable. The suspicion entry removal module 304 determines 726 if the suspicion variable is below a monitoring threshold. If the suspicion entry removal module 304 determines 726 the suspicion variable is below a monitoring threshold, the suspicion entry removal module 304 removes 728 the component violation entry with the expired time limit and the method 700 ends 730. If the suspicion reduction module 302 determines 722 there is not an expired time limit, the method 700 ends 730. Also, if the suspicion entry removal module 304 determines 726 the suspicion variable is not below a monitoring threshold, the method 700 ends 730.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored in a computer readable medium having computer usable program code programmed for dynamically adjusting performance monitoring of storage area network ("SAN") components, the operations of the computer program product comprising:

determining that a threshold violation associated with a SAN component is an initial threshold violation;

recording a component violation entry in response to the initial threshold violation;

adjusting a component violation entry associated with a SAN component in response to a threshold violation related to the SAN component;

analyzing the component violation entry based on analysis criteria; and adjusting a suspicion variable associated with the SAN component in response to results of the analysis of the component violation entry.

2. The computer program product of claim 1, further comprising decreasing the suspicion variable in response to expiration of a time limit associated with the component violation entry.

3. The computer program product of claim 2, further comprising removing the component violation entry in response to the suspicion variable decreasing below a monitoring threshold.

4. The computer program product of claim 1, further comprising responding based on the suspicion variable crossing a suspicion threshold.

5. The computer program product of claim 4, wherein responding based on the suspicion variable crossing a suspicion threshold comprises monitoring SAN components connected to the SAN component responsible for the threshold violation.

6. The computer program product of claim 5, wherein the connection between SAN components and the SAN component responsible for the threshold violation comprises a physical connection.

7. The computer program product of claim 5, wherein the connection between SAN components and the SAN component responsible for the threshold violation comprises a logical connection.

8. The computer program product of claim 4, wherein responding based on the suspicion variable crossing a suspicion threshold comprises adjusting an attribute associated with a SAN component responsible for the threshold violation.

9. The computer program product of claim 4, wherein responding based on the suspicion variable crossing a suspicion threshold comprises adjusting an attribute of a SAN component connected to the SAN component responsible for the threshold violation.

10. The computer program product of claim 4, wherein responding based on the suspicion variable crossing a suspicion threshold comprises rerouting SAN traffic.

11. The computer program product of claim 4, wherein responding based on the suspicion variable crossing a suspicion threshold comprises sending a notification.

12. The computer program product of claim 1, wherein the component violation entry comprises a history of threshold violations.

13. The computer program product of claim 12, further comprising adjusting the history to decrease the number of threshold violations tracked in response to expiration of a time limit associated with the component violation entry.

14. The computer program product of claim 13, further comprising removing a component violation entry in response to the number of threshold violations tracked crossing a minimum threshold violation limit.

15. The computer program product of claim 13, wherein adjusting the history to decrease the number of threshold violations tracked comprises decreasing a threshold violation counter.

16. The computer program product of claim 13, wherein adjusting the history to decrease the number of threshold violations tracked is in response to receiving a threshold expiration signal from the SAN component.

17. The computer program product of claim 1, wherein each suspicion variable corresponds to one SAN component violation entry.

18. An apparatus for dynamically adjusting performance monitoring of storage area network ("SAN") components, the apparatus comprising:
  an initial violation module configured to determine that a threshold violation associated with a SAN component is an initial threshold violation;
  a violation entry module configured to record a component violation entry in response to the initial threshold violation;
  an entry adjustment module configured to adjust a component violation entry associated with a SAN component in response to a threshold violation related to the SAN component;
  an analysis module configured to analyze the component violation entry based on analysis criteria; and
  a suspicion adjustment module configured to adjust a suspicion variable associated with the SAN component in response to results of the analysis of the component violation entry
  wherein each of the initial violation module, violation entry module, entry adjustment module, analysis module, and suspicion adjustment module comprise one or more of hardware and executable code stored on a computer readable medium.

19. The apparatus of claim 18, further comprising a suspicion reduction module configured to decrease the suspicion variable in response to expiration of a time limit associated with the component violation entry.

20. The apparatus of claim 19, wherein the suspicion reduction module further comprises a suspicion entry removal module configured to remove the component violation entry in response to the suspicion variable decreasing below a monitoring threshold.

21. The apparatus of claim 18, further comprising a suspicion response module configured to respond based on the suspicion variable crossing a suspicion threshold.

22. The apparatus of claim 21, wherein the suspicion response module further comprises a related component monitoring module configured to monitor SAN components connected to the SAN component responsible for the threshold violation.

23. The apparatus of claim 21, wherein the suspicion response module further comprises a direct attribute adjustment module configured to adjust an attribute associated with a SAN component responsible for the threshold violation.

24. The apparatus of claim 21, wherein the suspicion response module further comprises an indirect attribute adjustment module configured to adjust an attribute of a SAN component connected to the SAN component responsible for the threshold violation.

25. The apparatus of claim 21, wherein the suspicion response module further comprises a rerouting module configured to reroute SAN traffic.

26. A system for dynamically adjusting performance monitoring of storage area network ("SAN") components, the system comprising:
  a storage area network comprising at least one data storage device;
  a processor communicating with the storage area network;
  a memory communicating with the processor, the memory comprising
    an initial violation module configured to determine that a threshold violation associated with a SAN component is an initial threshold violation;
    a violation entry module configured to record a component violation entry in response to the initial threshold violation;
    an entry adjustment module configured to adjust a component violation entry associated with a SAN component in response to a threshold violation related to the SAN component;
    an analysis module configured to analyze the component violation entry based on analysis of the component violation entry;
    a suspicion adjustment module configured to adjust a suspicion variable associated with the SAN component in response to results of the analysis criteria; and
    a suspicion response module configured to respond based on the suspicion variable crossing a suspicion threshold.

27. The system of claim 26, wherein the component violation entry comprises a history of threshold violations.

28. The system of claim 27, further comprising a history reduction module configured to adjust the history to decrease the number of threshold violations tracked in response to expiration of a time limit associated with the component violation entry.

29. The system of claim 28, wherein the history reduction module further comprises a history entry removal module configured to remove a component violation entry in response to the number of threshold violations tracked crossing a minimum threshold violation limit.

30. A method for dynamically adjusting performance monitoring of storage area network ("SAN") components, the method comprising:
- determining that a threshold violation associated with a SAN component is an initial threshold violation;
- recording a component violation entry in response to the initial threshold violation;
- adjusting a component violation entry associated with a SAN component in response to a threshold violation related to the SAN component;
- adjusting a suspicion variable a large amount, the suspicion variable adjusted a large amount being associated with the component violation entry of a SAN component directly related to the SAN component responsible for the threshold violation;
- adjusting a suspicion variable a small amount, the suspicion variable adjusted a small amount being associated with the component violation entry of a SAN component indirectly related to the SAN component responsible for the threshold violation;
- decreasing a suspicion variable associated with a component violation entry in response to expiration of a time limit associated with the component violation entry; and
- removing the component violation entry with the expired time limit in response to the suspicion variable associated with the component violation entry with the expired time limit decreasing below a monitoring threshold.

31. The method of claim 30, further comprising responding based on a suspicion variable crossing a suspicion threshold.

32. A method for dynamically adjusting performance monitoring of storage area network ("SAN") components, the method comprising:
- accessing a SAN;
- executing a monitoring software utility to monitor SAN components, the monitoring software utility configured to
  - determine that a threshold violation associated with a SAN component is an initial threshold violation;
  - record a component violation entry in response to the initial threshold violation;
  - adjust a component violation entry associated with a SAN component in response to a threshold violation related to the SAN component;
  - analyze the component violation entry based on analysis criteria; and
  - adjust a suspicion variable associated with the SAN component in response to results of the analysis of the component violation entry;
- analyzing the suspicion variable; and
- reporting the suspicion variable.

33. The method of claim 32, further comprising responding to the suspicion variable.

34. The method of claim 33, wherein responding to the suspicion variable comprises monitoring SAN components connected to the SAN component associated with the suspicion variable.

35. The method of claim 33, wherein responding to the suspicion variable comprises rerouting traffic.

* * * * *

UNITED STATES PATENT AND TRADEMARK OFFICE
CERTIFICATE OF CORRECTION

PATENT NO. : 7,624,178 B2  Page 1 of 1
APPLICATION NO. : 11/363432
DATED : November 24, 2009
INVENTOR(S) : Gregory John Tevis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

Twenty-sixth Day of October, 2010

David J. Kappos
*Director of the United States Patent and Trademark Office*